(12) United States Patent
Naito

(10) Patent No.: US 11,201,517 B2
(45) Date of Patent: Dec. 14, 2021

(54) ELECTRIC WORK MACHINE

(71) Applicant: MAKITA CORPORATION, Anjo (JP)

(72) Inventor: Akira Naito, Anjo (JP)

(73) Assignee: MAKITA CORPORATION, Anjo (JP)

(*) Notice: Subject to any disclaimer, the term of this patent is extended or adjusted under 35 U.S.C. 154(b) by 154 days.

(21) Appl. No.: 16/682,216

(22) Filed: Nov. 13, 2019

(65) Prior Publication Data

US 2020/0204027 A1 Jun. 25, 2020

(30) Foreign Application Priority Data

Dec. 21, 2018 (JP) .............................. JP2018-240044

(51) Int. Cl.
*H02K 3/28* (2006.01)
*H02K 1/12* (2006.01)
*H02K 1/22* (2006.01)

(52) U.S. Cl.
CPC ................. *H02K 3/28* (2013.01); *H02K 1/12* (2013.01); *H02K 1/22* (2013.01)

(58) Field of Classification Search
CPC .. H02K 1/12; H02K 1/22; H02K 3/28; H02K 11/215; H02K 1/146; H02K 1/276; H02K 29/08; H02K 3/34; H02K 3/52; H02K 5/15; H02K 5/1732; H02K 7/14
USPC ....................................................... 310/179
See application file for complete search history.

(56) References Cited

U.S. PATENT DOCUMENTS

| | | | | |
|---|---|---|---|---|
| 2007/0278876 A1* | 12/2007 | Haga | ...................... | H02K 3/325 310/71 |
| 2013/0115064 A1* | 5/2013 | Kimura | ................... | F01D 25/08 415/177 |
| 2015/0008783 A1* | 1/2015 | Kitaji | ................... | H02K 5/1732 310/215 |
| 2015/0028727 A1* | 1/2015 | Watanabe | ................ | H02K 9/06 310/60 A |
| 2017/0317548 A1* | 11/2017 | Suzuki | ................... | B23D 47/12 |
| 2018/0034336 A1* | 2/2018 | Mori | ........................ | H02K 3/12 |
| 2018/0034354 A1* | 2/2018 | Niwa | .................... | H02K 3/325 |
| 2018/0183282 A1* | 6/2018 | Aso | ........................ | H02K 15/12 |
| 2018/0205281 A1* | 7/2018 | Yoshida | ............. | H02K 15/0068 |

FOREIGN PATENT DOCUMENTS

JP 2015-126563 A 7/2015

* cited by examiner

*Primary Examiner* — Alex W Mok
(74) *Attorney, Agent, or Firm* — Oliff PLC

(57) ABSTRACT

An electric work machine includes a motor in which a wire is wound around each tooth of a stator in an aligned manner. The electric work machine includes a motor including a rotor and a stator. The stator includes a stator core having a first end face and a second end face, and having teeth protruding inwardly, a first insulator covering the first end face, a second insulator covering the second end face, a rib located on at least one of the first insulator or the second insulator, and overlapping the teeth in an axial direction of the teeth, and coils including a wire wound around the teeth via the first insulator and the second insulator and the rib.

19 Claims, 19 Drawing Sheets

ELECTRIC WORK MACHINE

CROSS-REFERENCE TO RELATED APPLICATIONS

This application claims the benefit of priority to Japanese Patent Application No. 2018-240044, filed on Dec. 21, 2018, the entire contents of which are hereby incorporated by reference.

BACKGROUND

1. Technical Field

The present invention relates to an electric work machine and a method for forming a stator having coils in a motor for an electric work machine. Electric work machines include power tools, gardening tools such as lawn mowers, and air compressors for air tools.

2. Description of the Background

An electric work machine such as a power tool uses a compact, durable brushless motor as its driving source. A known inner-rotor brushless motor includes a cylindrical stator and a rotor placed inside the stator, as one example is described in Japanese Unexamined Patent Application Publication No. 2015-126563. The teeth protruding from a stator toward the axis receive coils wound around them with insulators in between.

BRIEF SUMMARY

The coils on the stator are formed by a wire wound around the teeth automatically using a winding machine. During winding, the wire placed through a tooth portion of an insulator (a portion covering an end face of the tooth) is received at the edges on both sides in the width direction of the tooth portion (in the circumferential direction of the stator), leaving a space between the middle of the tooth portion and the wire. The turns (each turn) of the wire may be misaligned in the radial direction of the stator, and may cross each other, thus reducing the total number of turns.

One or more aspects of the present invention are directed to an electric work machine including a motor in which a wire is wound around each tooth of a stator in an aligned manner.

A first aspect of the present invention provides an electric work machine, including:
a motor including
  a rotor, and
  a stator including
    a stator core having a first end face and a second end face, and having teeth protruding inwardly,
    a first insulator covering the first end face,
    a second insulator covering the second end face,
    a rib located on at least one of the first insulator or the second insulator, and overlapping the teeth in an axial direction of the teeth, and
    coils including a wire wound around the teeth via the first insulator and the second insulator and the rib.

A second aspect of the present invention provides an electric work machine, including:
a motor including
  a rotor, and
  a stator including
    a stator core including a first end face and a second end face, and teeth protruding inwardly,
    a first insulator covering the first end face,
    a second insulator covering the second end face,
    coils including a wire wound around the teeth via the first insulator and the second insulator, and
    guide parts located on the first insulator or the second insulator to guide the wire to a basal end of each tooth when the wire is wound.

A third aspect of the present invention provides a method for forming coils on a stator included in a motor for an electric work machine, the method including:
placing, on a stator core including teeth protruding from the stator core, insulators covering at least upper end faces and lower end faces of the teeth in an axial direction of the stator core;
placing, in middle portions of at least either the upper end faces or the lower end faces covered with the insulators, a rib protruding from the at least upper end faces or the lower end faces; and
winding a wire around the teeth via the insulators and the rib.

The electric work machine according to the above aspects enables a wire to be wound around each tooth of a stator in an aligned manner.

DETAILED DESCRIPTION

Lawn Mower

Figure 1:
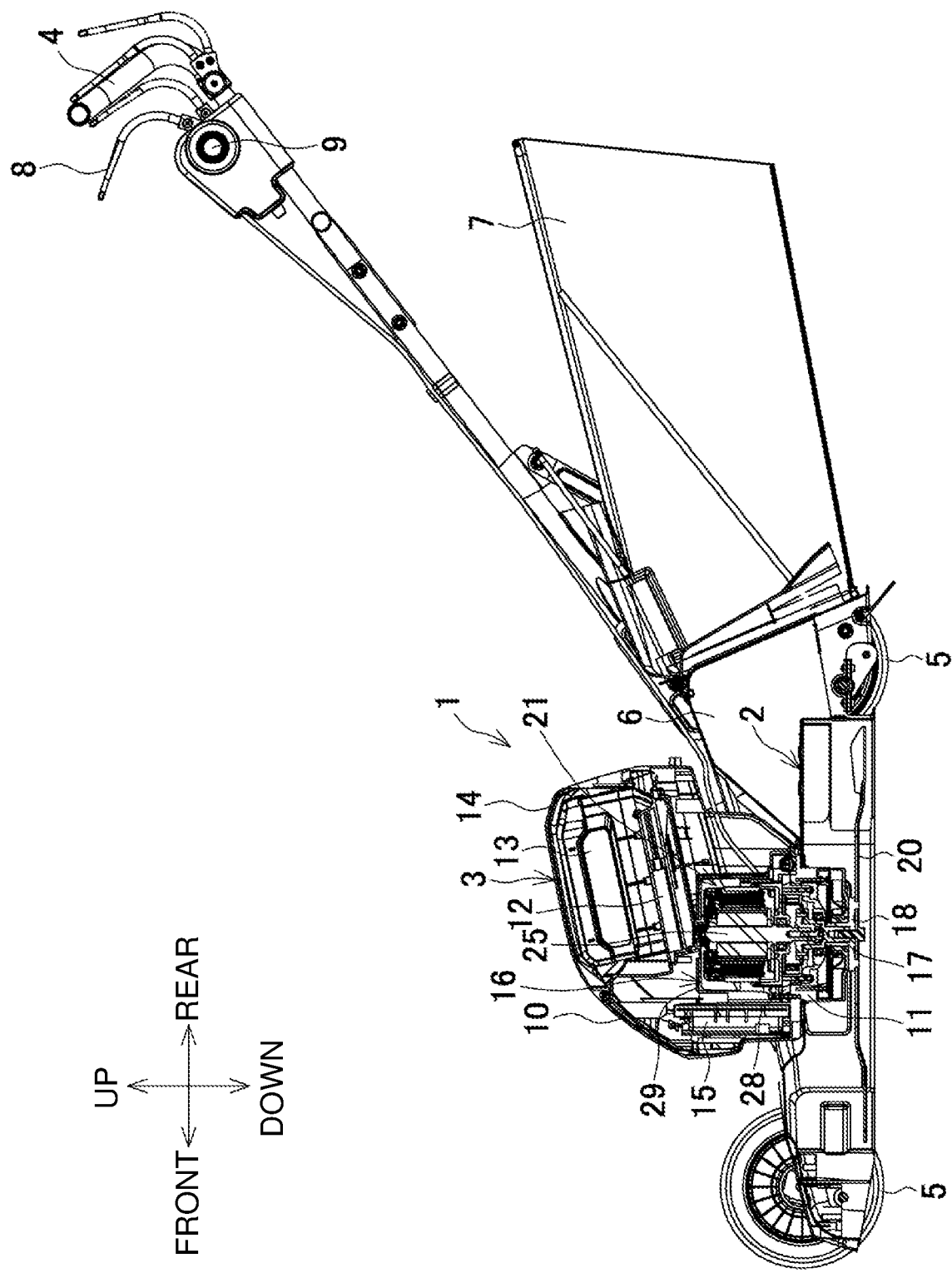
FIG. 1 is a longitudinal central sectional view of a lawn mower.
Figure 2:
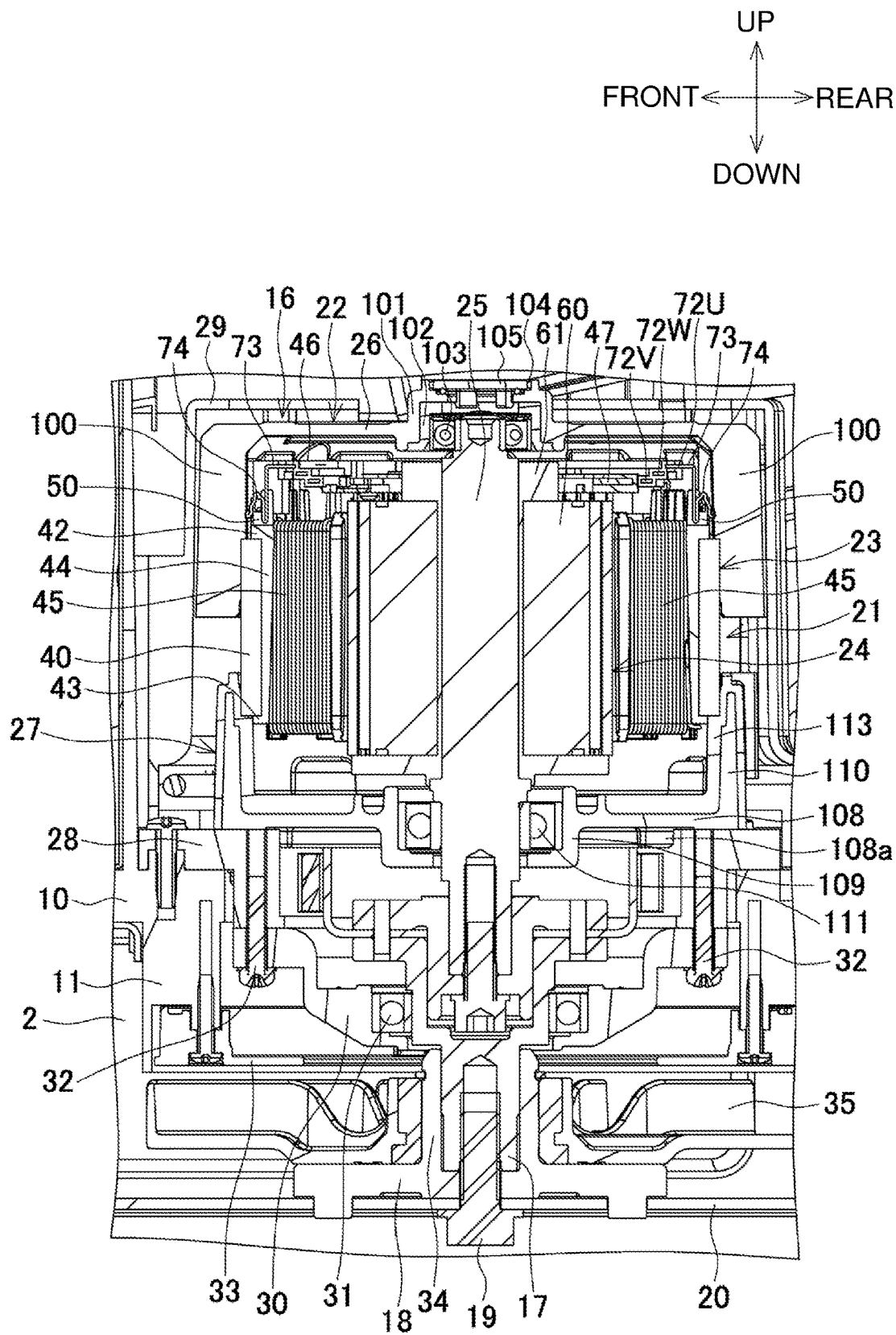
FIG. 2 is an enlarged view of a part including a motor unit.

An electric work machine according to an embodiment will now be described with reference to the drawings.
The electric work machine according to the present embodiment is a rechargeable lawn mower. FIG. 1 is a longitudinal central sectional view of a lawn mower. FIG. 2 is an enlarged view of a part including a motor unit.

The lawn mower 1 includes a base 2, a body 3, and a handle 4. The base 2 extends in the front-rear direction, and has an opening in its lower surface. The body 3 is coupled to a central area of the upper side of the base 2. The handle 4 extends obliquely upward from the base 2 toward the rear.

The base 2 includes a pair of front wheels 5 and a pair of rear wheels 5. The base 2 is movable back and forth with the handle 4. Behind the base 2, a rear cover 6 and a grass bag 7 are located under the handle 4. The handle 4 has a switch lever 8 on the rear end. The handle 4 has a lock-off button 9 in front of the switch lever 8. The lock-off button 9 is used to lock the operation of the switch lever 8 in a normal state. That is, the switch lever 8 cannot be pulled by a user in the normal state even if the user would inadvertently pull the switch lever 8. The lock-off button 9 is pressed to unlock the switch lever 8, allowing the switch lever 8 to be pulled.

The body 3 includes a body housing 10. The body housing 10 has, at its lower end, a cylindrical unit 11 protruding into the base 2. The cylindrical unit 11 is open downward. The body housing 10 has, in its upper portion, a battery holder 12 having a front portion inclined downward. The battery holder 12 can receive a battery pack 13 as a power supply inserted from its upper rear. The battery holder 12 can be open and closed with a battery cover 14.

The body housing 10 holds, in its front portion, a controller 15 extending vertically. The controller 15 includes a control circuit board (not shown). Behind the controller 15, a motor unit 16 is located under the battery holder 12. A rotational shaft 25 of a brushless motor 21 (described later) protrudes downward from the motor unit 16. A spindle 17 is coaxially coupled to the lower end of the rotational shaft 25. The spindle 17 protrudes downward from the cylindrical unit 11 into the base 2. The spindle 17 has, on its lower end, a cutting blade 20, which is a flat plate, attached perpendicular to the spindle 17 using an inner flange 18 and a bolt 19.

Figure 3:
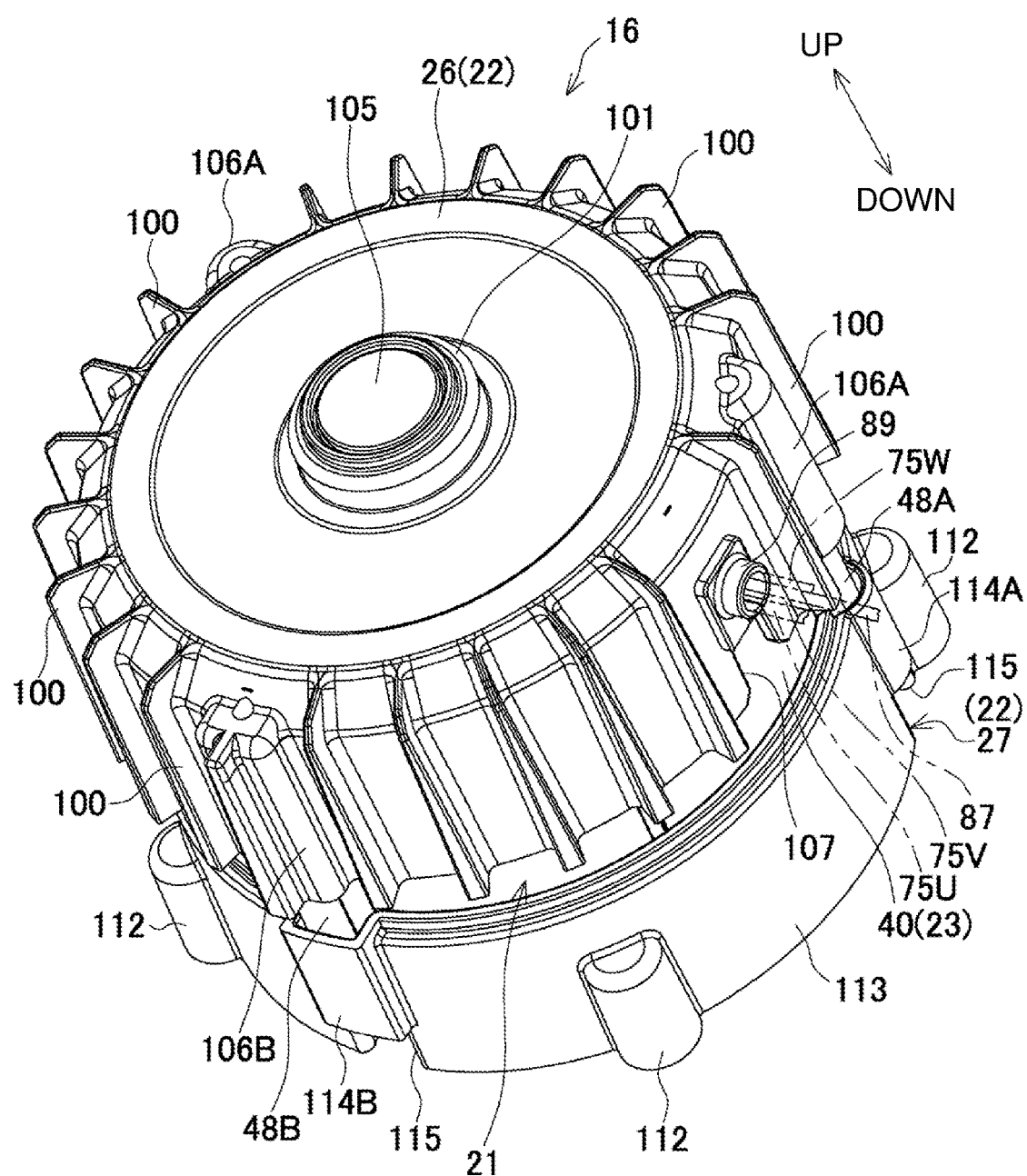
FIG. 3 is a perspective view of the motor unit.
Figure 4:
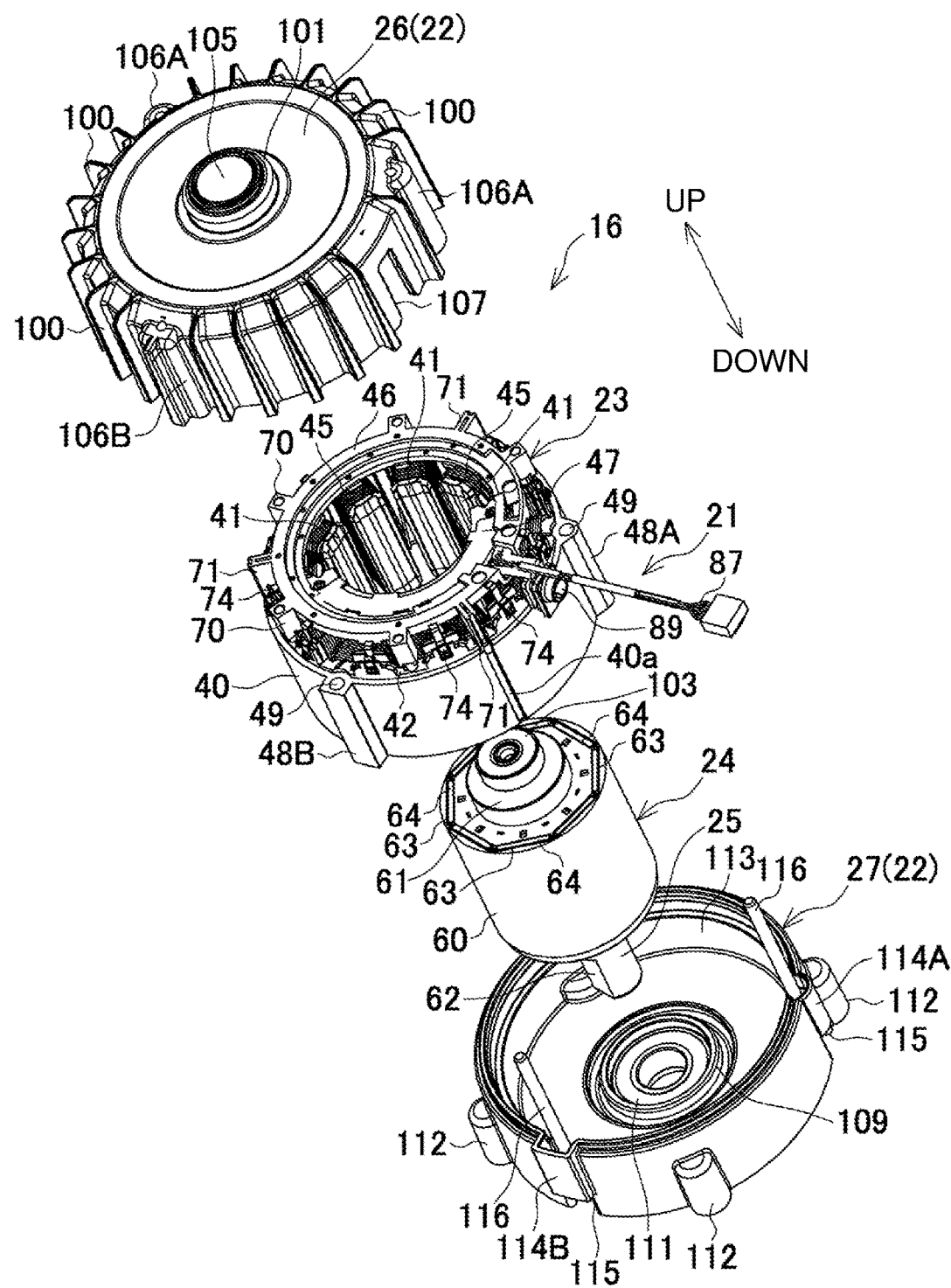
FIG. 4 is an exploded perspective view of the motor unit.

As shown in FIGS. 3 and 4, the motor unit 16 includes the brushless motor 21 and a motor case 22. The motor case 22 holds the brushless motor 21. The brushless motor 21 is an inner-rotor motor including a cylindrical stator 23 and a rotor 24. The rotor 24 extends through the stator 23, and includes the rotational shaft 25 along the axis. The motor case 22 includes an upper case 26 and a lower case 27. The upper case 26 and the lower case 27 hold the stator 23 from above and below to axially support the rotational shaft 25. The lower case 27 is mounted on a base plate 28 located on the cylindrical unit 11. A motor cover 29 is located over the base plate 28 and covers the motor unit 16 from above.

A bearing retainer 30 is located below the base plate 28 and is mounted on the base plate 28 with screws 32 from below. The bearing retainer 30 axially supports the spindle 17 with a bearing 31. The spindle 17 extends through the bearing retainer 30. The lower end of the spindle 17 extends through a baffle 33 screwed to the lower end of the cylindrical unit 11, and protrudes into the base 2. The cutting blade 20 is attached to the inner flange 18. The inner flange 18 has a cylinder 34 into which the lower end of the spindle 17 is fitted. The cylinder 34 has a centrifugal fan 35 on its outer circumference.

Stator

Figure 5:
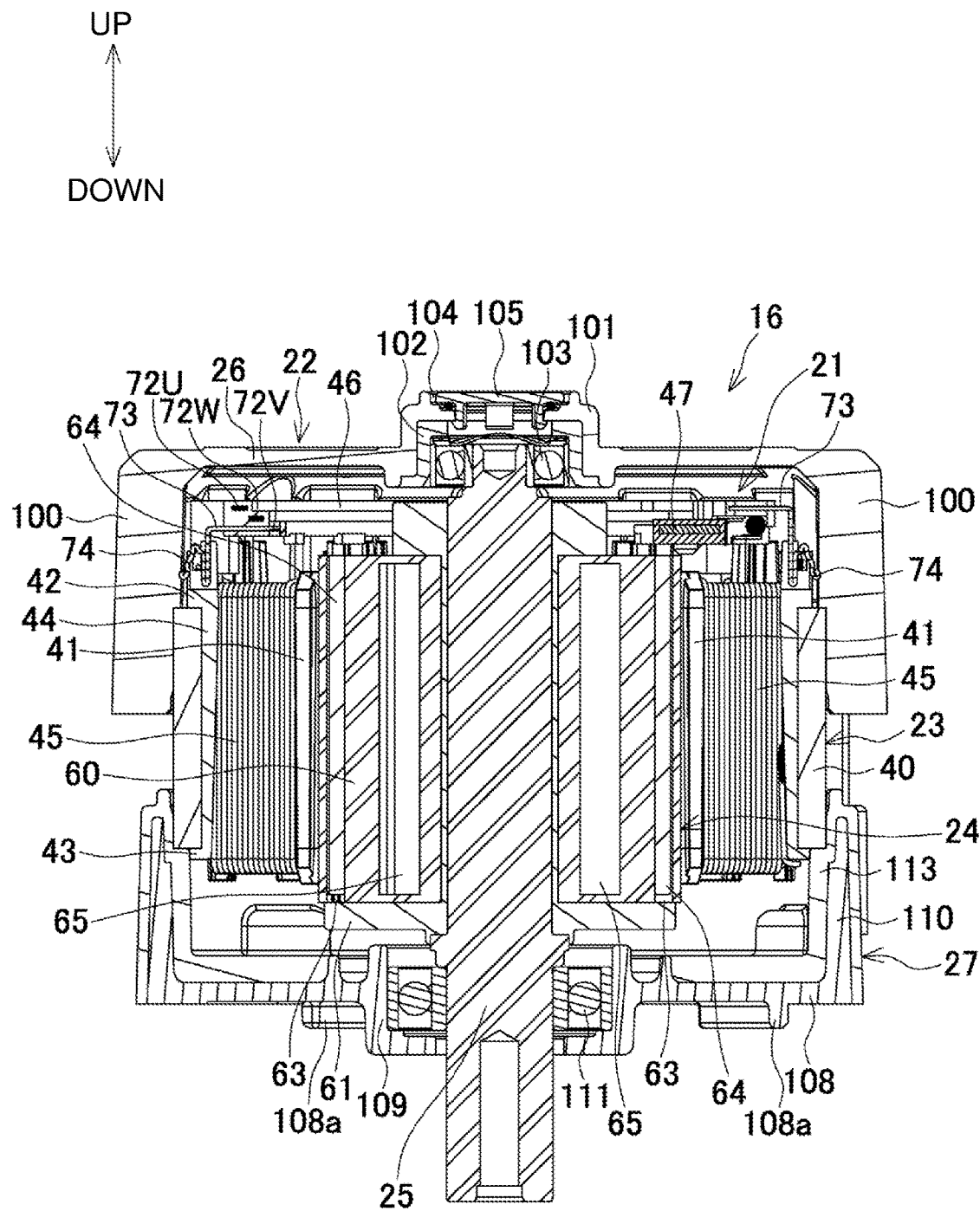
FIG. 5 is a longitudinal sectional view of the motor unit.
Figure 6:
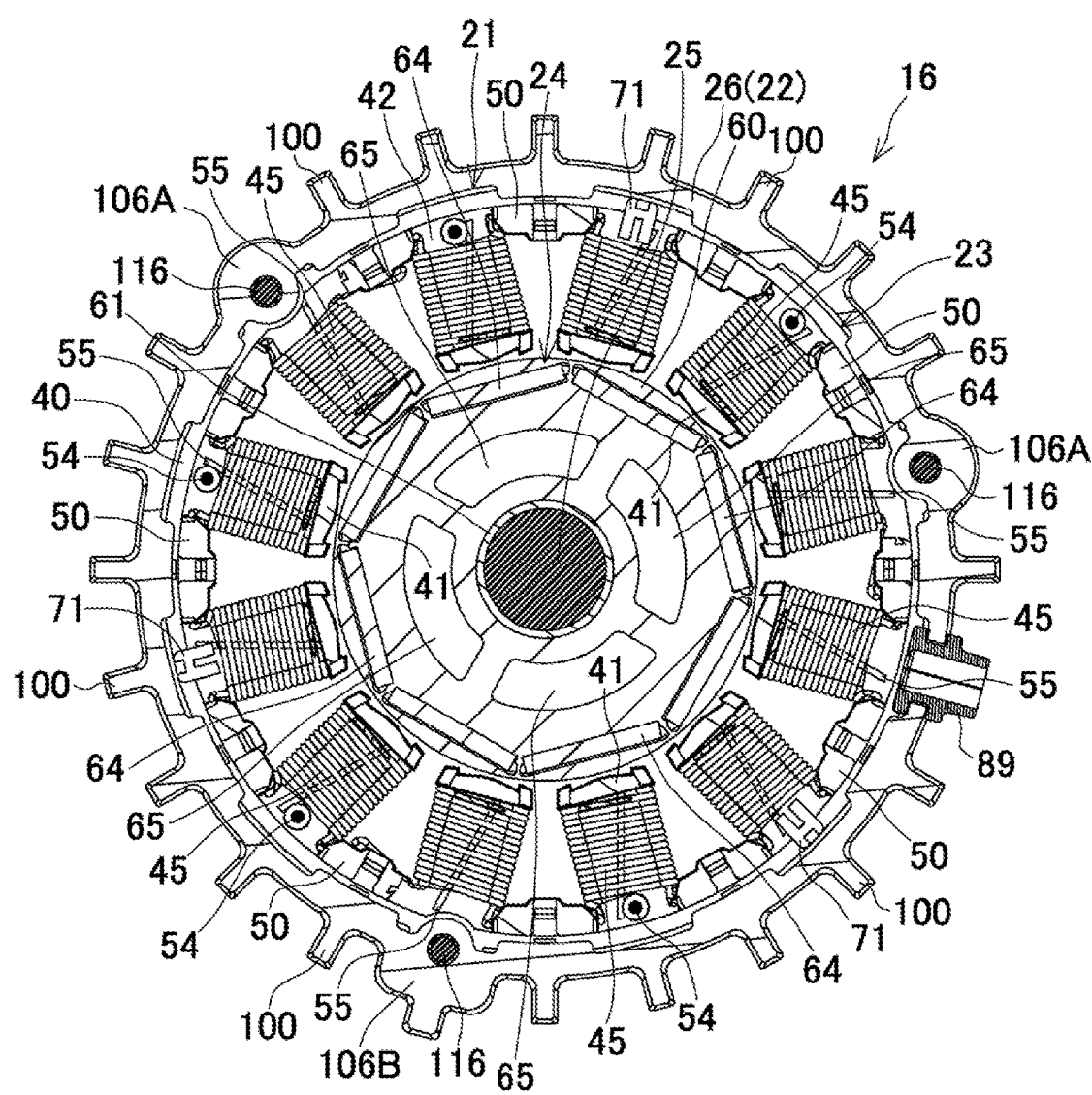
FIG. 6 is a cross-sectional view of an upper case in the motor unit.

As shown in FIGS. 5 and 6, the stator 23 includes a stator core 40, an upper insulator (first insulator) 42, a lower insulator (second insulator) 43, an insulating unit 44, and coils 45. The stator core 40 includes a plurality of steel plates axially stacked on one another, and includes a plurality of (twelve in this example) teeth 41 protruding inwardly. The upper and lower insulators 42 and 43 are resin electrical insulators. The upper insulator 42 is formed integrally with the upper end of the stator core 40, and the lower insulator 43 is formed integrally with the lower end of the stator core 40. The insulating unit 44 is formed from a resin. The insulating unit 44 extends across the upper insulator 42 and the lower insulator 43 to be integral with the upper and lower insulators 42 and 43. The insulating unit 44 covers the inner peripheral surface of the stator core 40 and the outer peripheral surface of each tooth 41 excluding the protruding end face. The coils 45 includes a wire that is wound around the tooth 41 via the insulating unit 44. A short-circuiting member 46 and a sensor circuit board 47 are joined to the upper insulator 42. The short-circuiting member 46 is electrically connected to a wire forming each coil 45 to form a three-phase connection. The sensor circuit board 47 detects the rotational position of the rotor 24.

Figure 7:
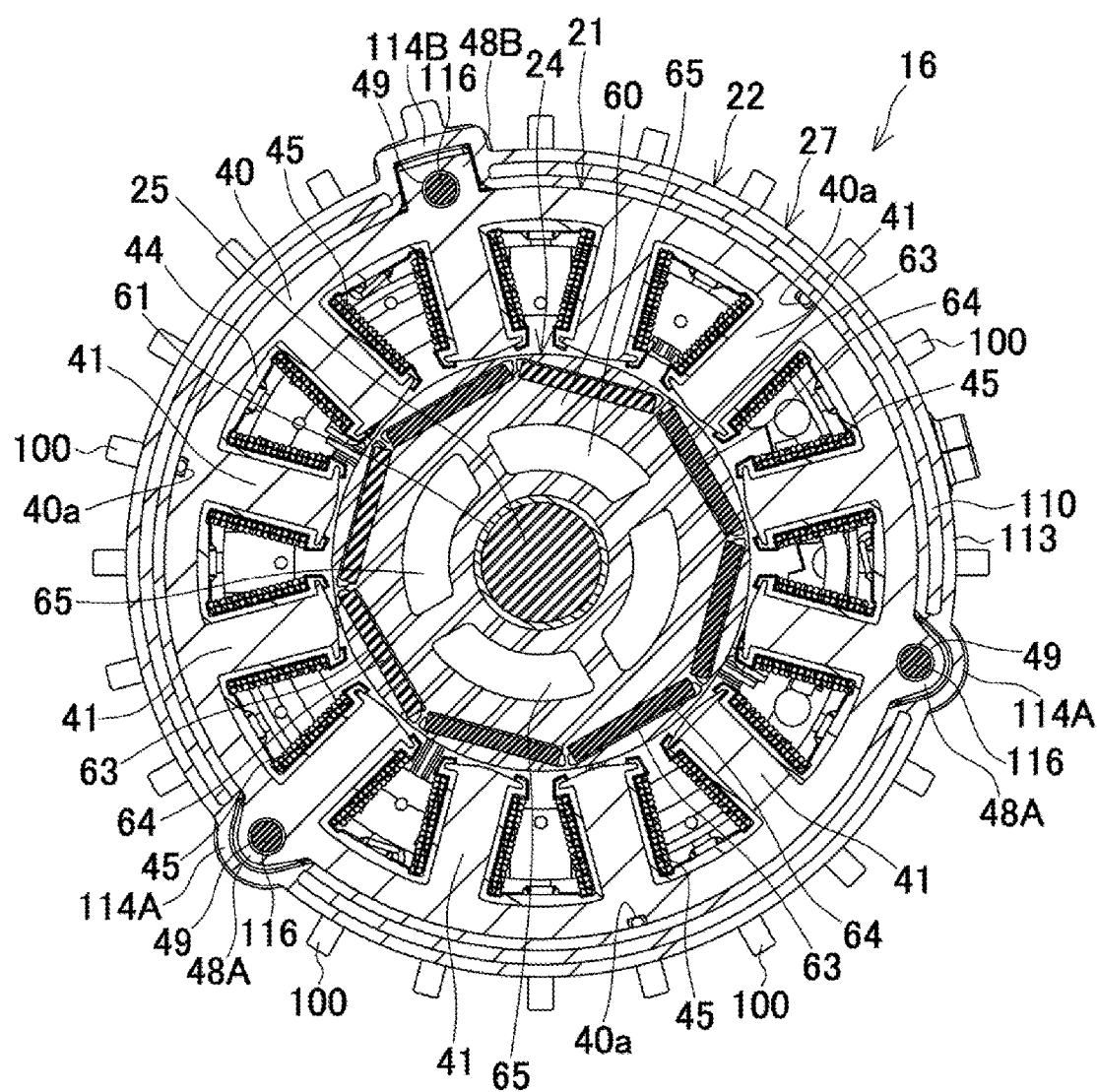
FIG. 7 is a cross-sectional view of a lower case in the motor unit.
Figure 8:
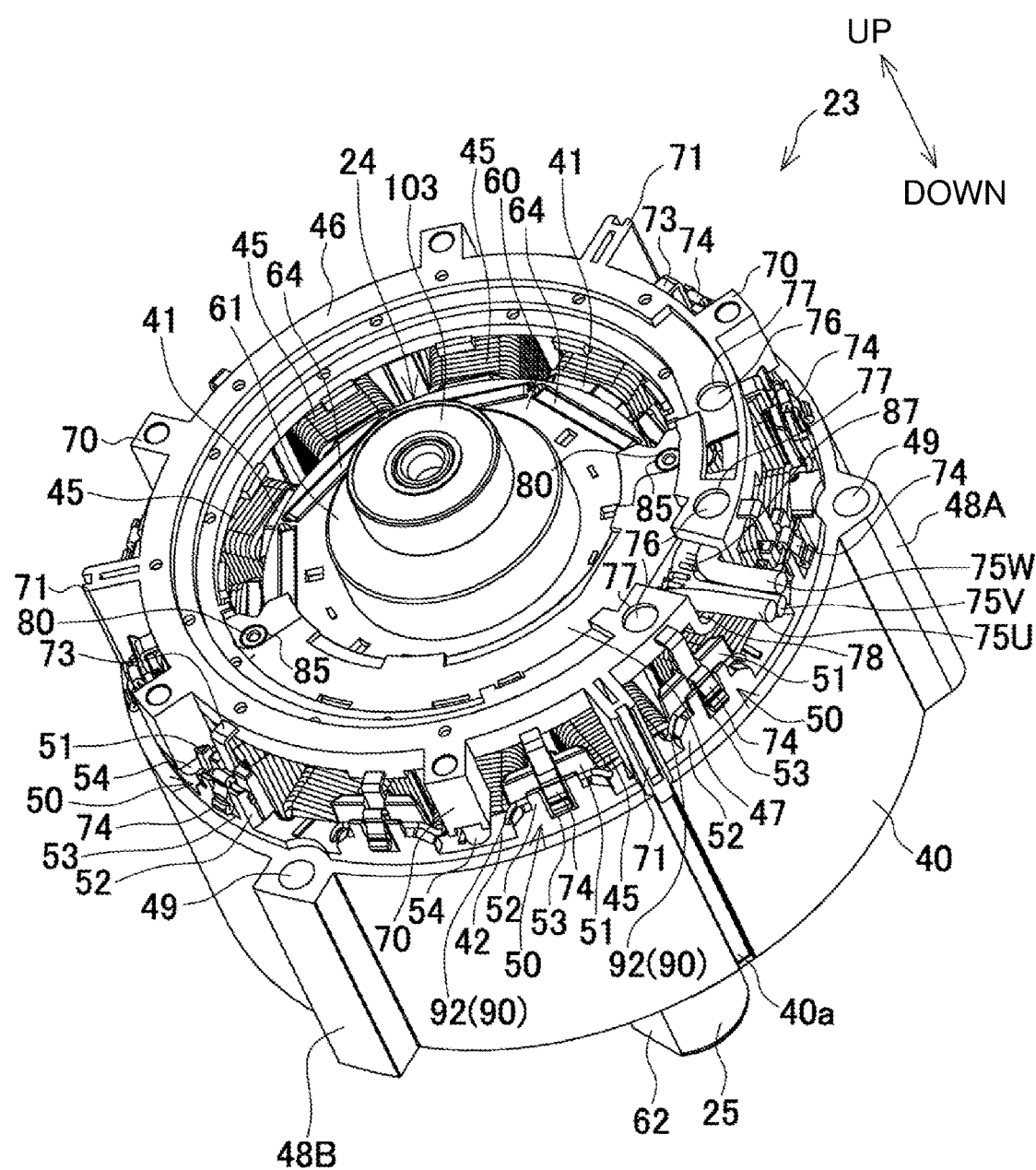
FIG. 8 is a perspective view of a brushless motor.
Figure 9:
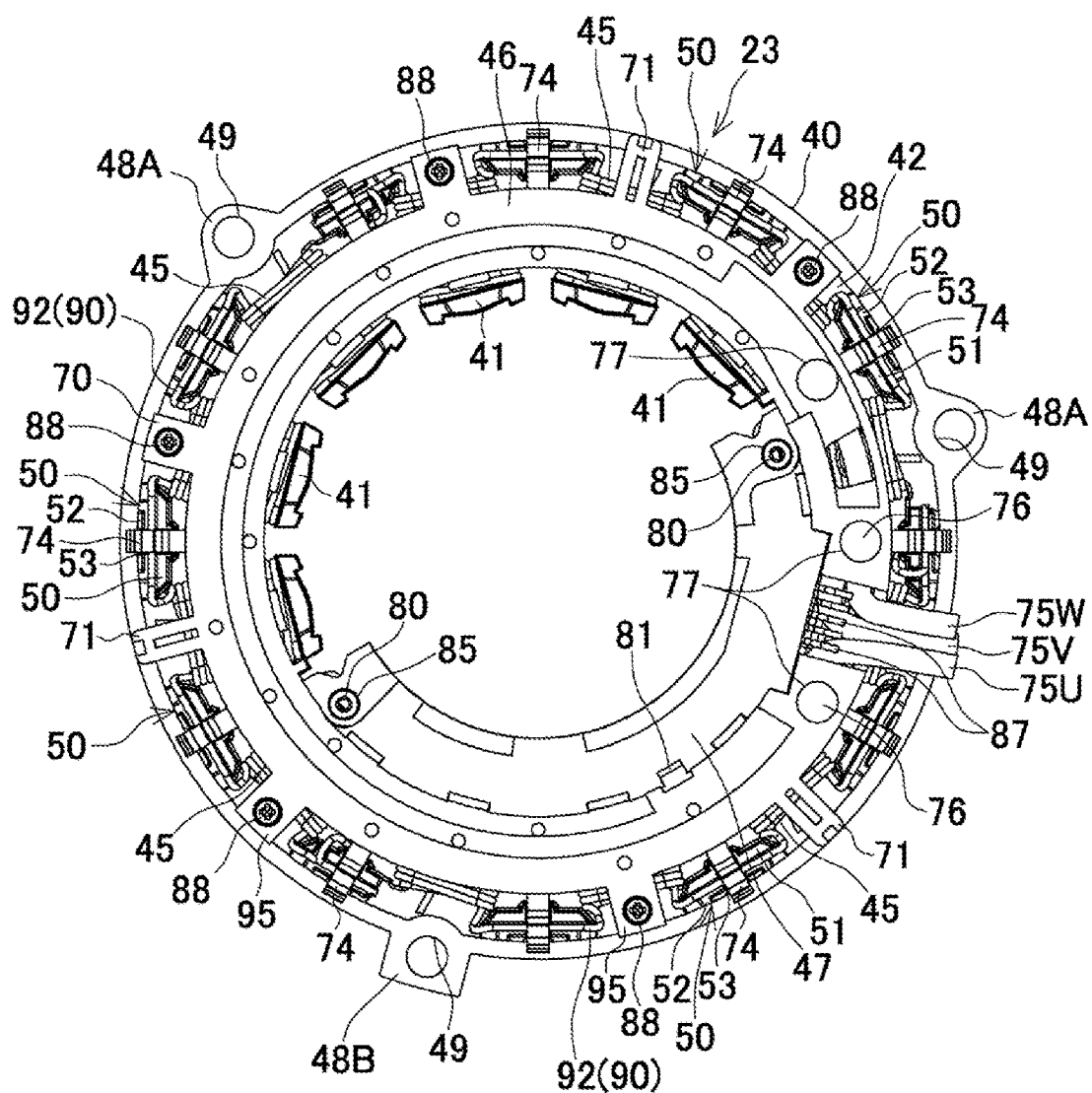
FIG. 9 is a plan view of a stator.

As shown in FIGS. 7 to 9, the stator core 40 has three ridges 48A and 48B (two ridges 48A and one ridge 48B) at circumferentially equal intervals (about 120 degrees) on the outer circumferential surface. The ridges 48A have a tapered cross section with a circumferential width decreasing radially outward from the stator core 40. The ridge 48B is not tapered but has a rectangular cross section having the same circumferential width in the radial direction. The ridge 48B is slightly curved (or has a curved surface) to protrude circumferentially outward on the radially outer edge. The ridges 48A and 48B each have a through-hole 49. The stator core 40 has, on its outer circumferential surface, a groove 40a extending axially between the ridges 48A and 48B.

Figure 11:
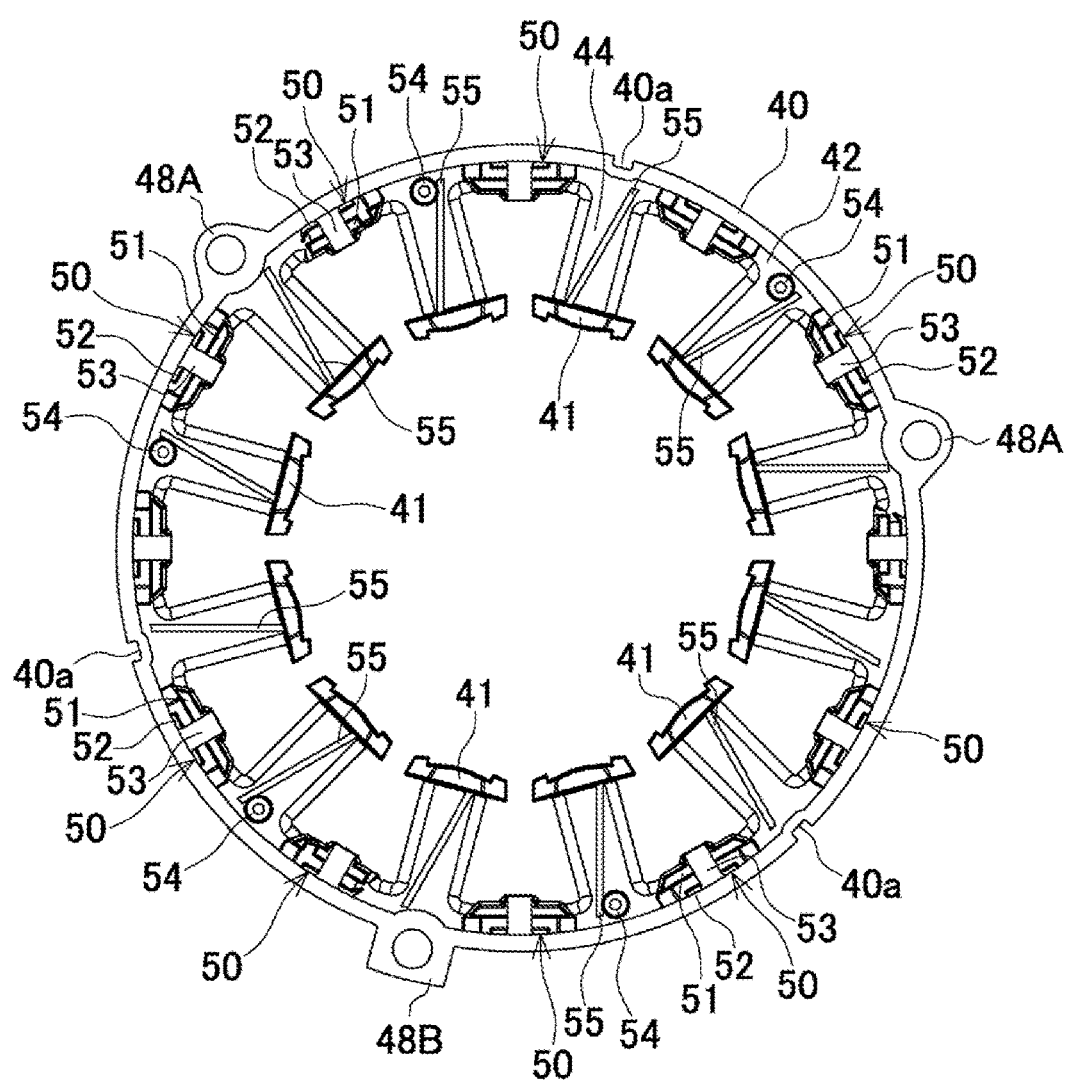
FIG. 11 is a plan view of a stator core yet to receive coils.

As shown in FIGS. 6 and 11, the upper insulator 42 has a ring-like shape, and the upper insulator 42 is formed integrally on the upper end face (first end face) of the stator core 40. The upper insulator 42 has twelve terminal holders 50 at circumferentially equal intervals (about 30 degrees) on its upper surface to hold fuse terminals 74 arranged on the short-circuiting member 46. Each terminal holder 50 includes an inner wall 51 on its inner periphery and an outer wall 52 on its outer periphery. The inner wall 51 and the outer wall 52 are radially spaced from each other by a distance substantially corresponding to the diameter of a wire 90. Each terminal holder 50 has, on its circumferential middle between the inner wall 51 and the outer wall 52, a fitting groove 53 to receive the fuse terminal 74. The upper insulator 42 has, on its upper surface, five fastening bosses 54 protruding for fastening the short-circuiting member 46. The five fastening bosses 54 protrude at positions corresponding to the roots of every other tooth 41.

Figure 12:
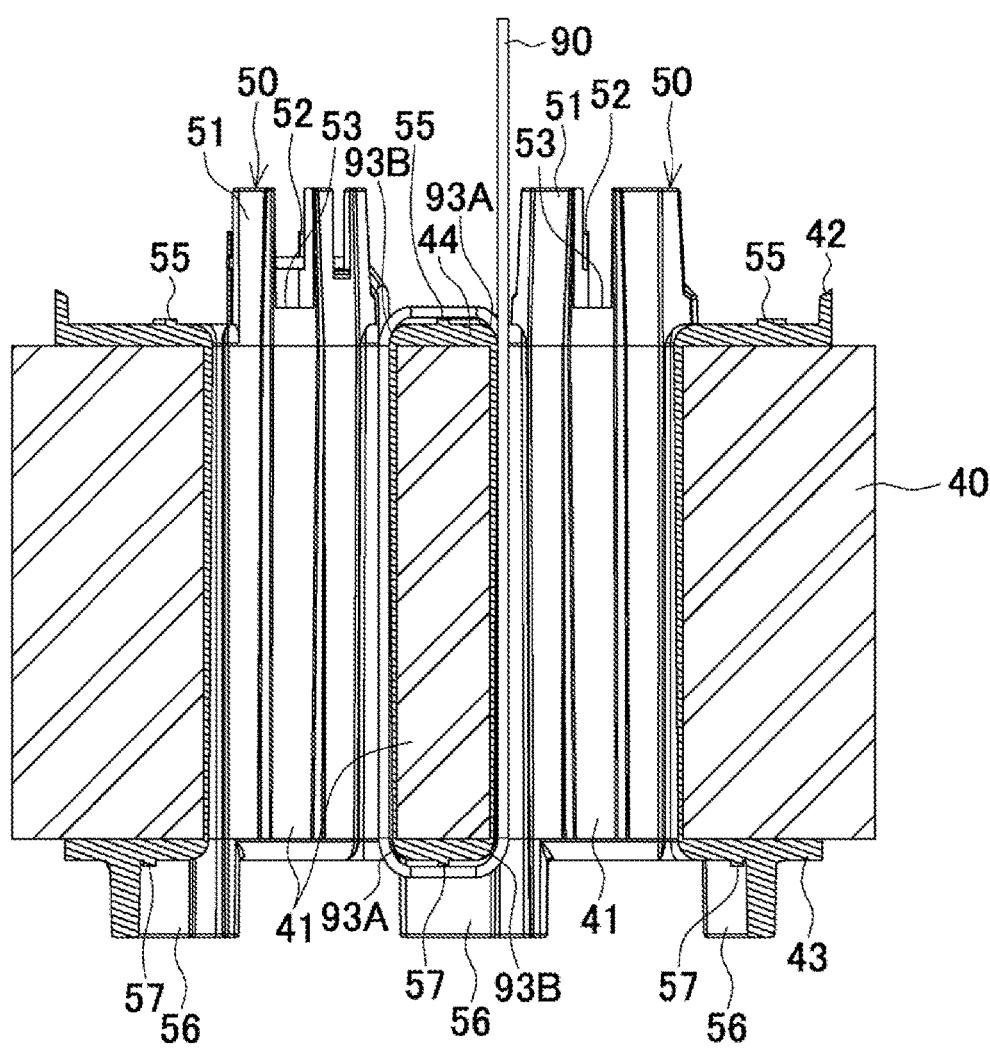
FIG. 12 is a longitudinal sectional view of the stator core with a wire wound around teeth.

As shown in FIG. 12, the insulating unit 44 of the upper insulator 42 has an oblique rib 55 protruding in a middle portion of its upper end face overlapping each tooth 41 in the vertical direction. Each oblique rib 55 diagonally passes the center of the corresponding tooth 41 extending in the radial direction of the stator core 40. Each oblique rib 55 is integral with the insulating unit 44, and protrudes from the root to the distal end of the corresponding tooth 41. Each oblique rib 55 extends more radially outward than the wire 90.

Figure 10:
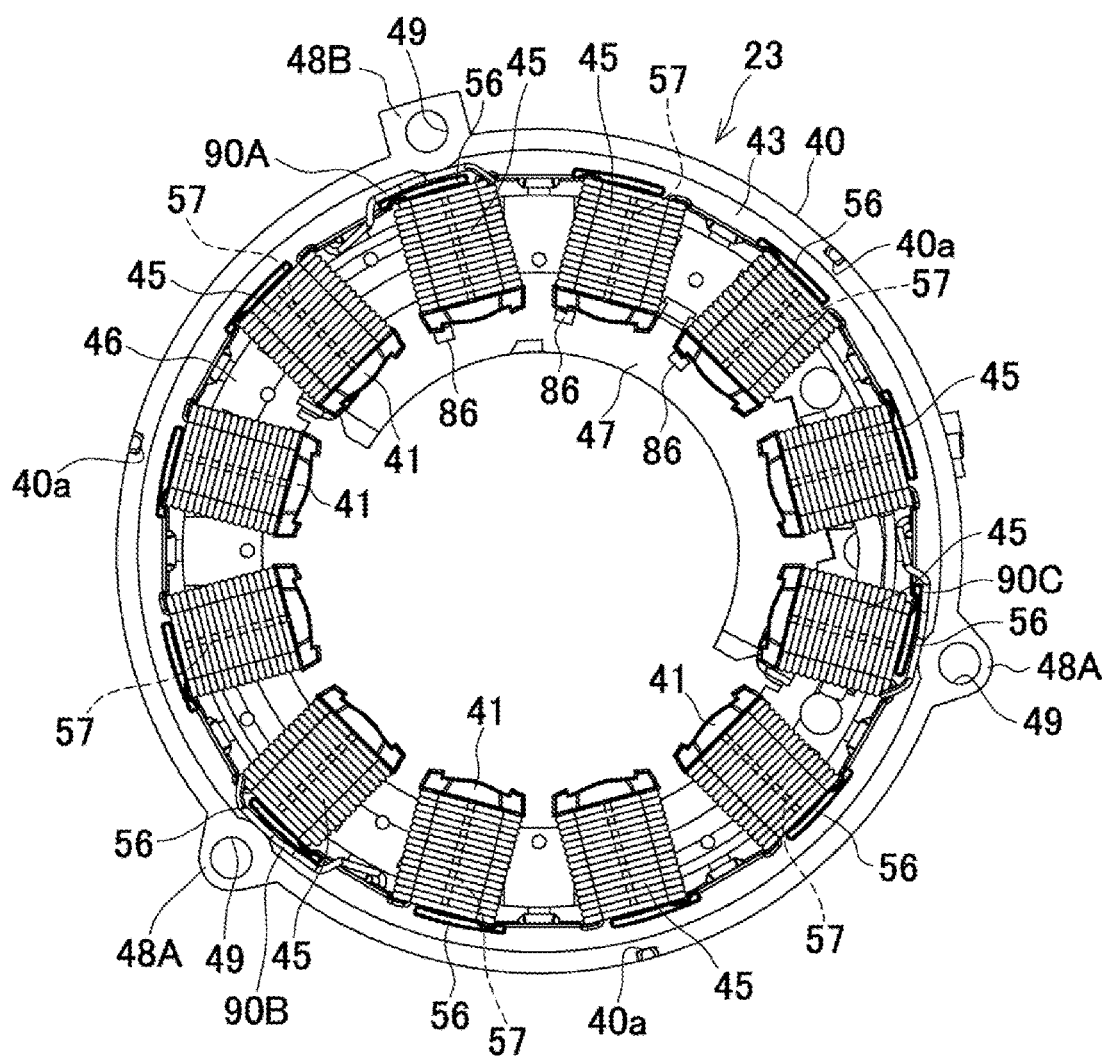
FIG. 10 is a bottom view of the stator.
Figure 13:
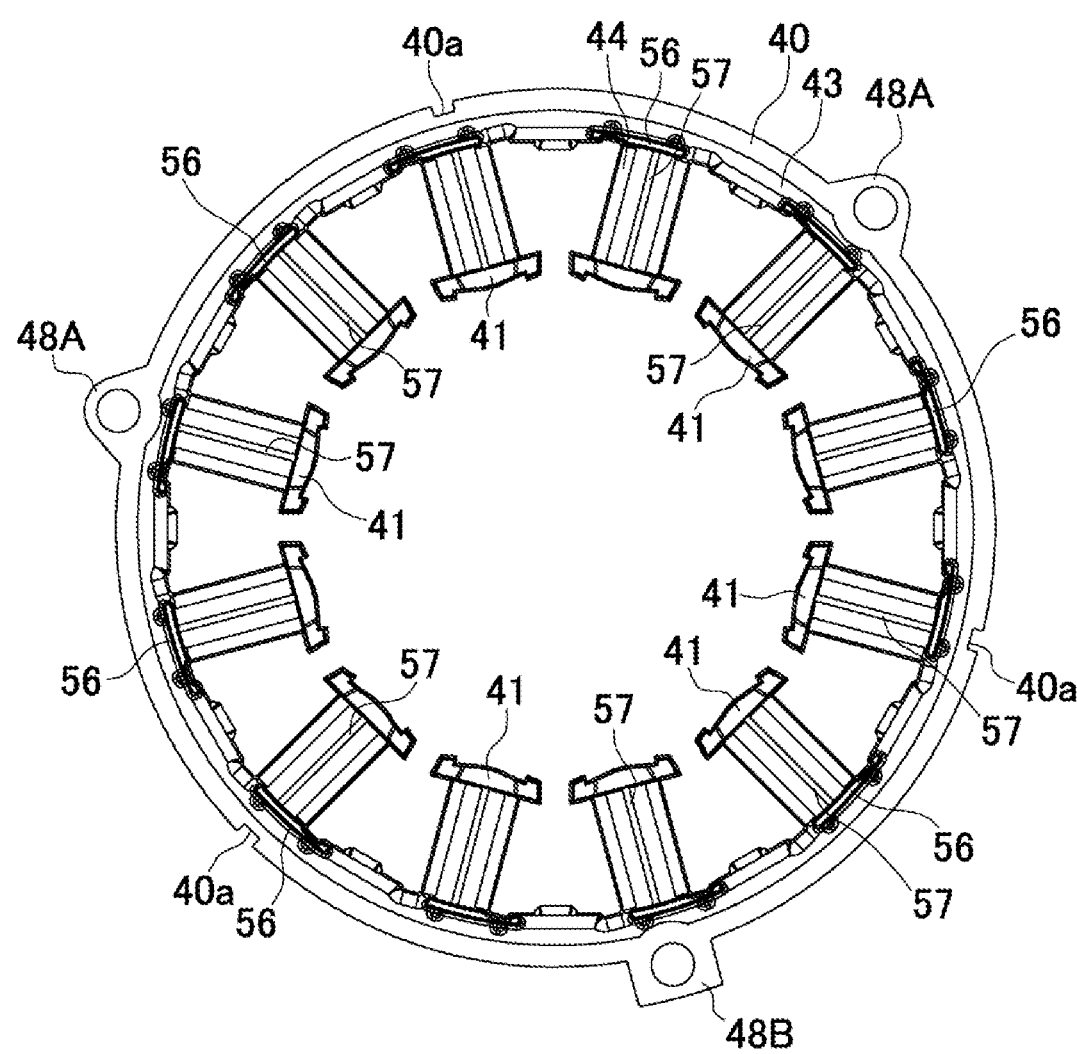
FIG. 13 is a bottom view of the stator core yet to receive coils.

As shown in FIGS. 10 and 13, the lower insulator 43 has a ring-like shape, and the lower insulator 43 is formed integrally on the lower end face (second end face) of the stator core 40. The lower insulator 43 has twelve guide walls (guide parts) 56 standing erect on its lower surface. The twelve guide walls 56 stand erect circumferentially at positions slightly shifted circumferentially from the roots of the teeth 41.

The insulating unit 44 of the lower insulator 43 has a rib 57 protruding on its lower end face overlapping each tooth 41 in the vertical direction. Each rib 57 extends straight radially through the center of the corresponding tooth 41. Each rib 57 is integral with the corresponding tooth 41, and protrudes from the root to the distal end of the tooth 41. Each rib 57 extends more radially outward than the wire 90.

As shown in FIGS. 4 to 8, the rotor 24 includes the rotational shaft 25 extending along the axis of a cylindrical rotor core 60 including a plurality of steel plates that are axially stacked on one another. The rotor core 60 and the rotational shaft 25 are formed integrally using a resin 61. The rotational shaft 25 has a chamfered lower end 62 (FIG. 4) on the lower end.

The rotor core 60 has, in its peripheral portion, a plurality of (eight in this example) magnet slots 63 that are arranged concyclic and extend axially. Each magnet slot 63 receives a permanent magnet plate 64. The rotor core 60 has, at positions inward from the permanent magnet plates 64, spaces (weight saving holes) 65 that are defined by aligning the through-holes in the steel plates except in their upper and lower plates. This reduces the weight of the rotor 24.

Short-Circuiting Member and Sensor Circuit Board

As shown in FIGS. 8 and 9, the short-circuiting member 46 has a ring-like shape. The short-circuiting member 46 is made of resin. The short-circuiting member 46 is slightly smaller than the upper insulator 42. The short-circuiting member 46 has five fitting bosses 70 and three engagement ribs 71 that protrude on the outer circumference. The fitting bosses 70 are square, and have cylindrical hollows. The fitting bosses 70 are fitted onto the corresponding fastening bosses 54 on the upper insulator 42 from above. The engagement ribs 71 are engaged with the grooves 40a on the stator core 40.

Figure 14:
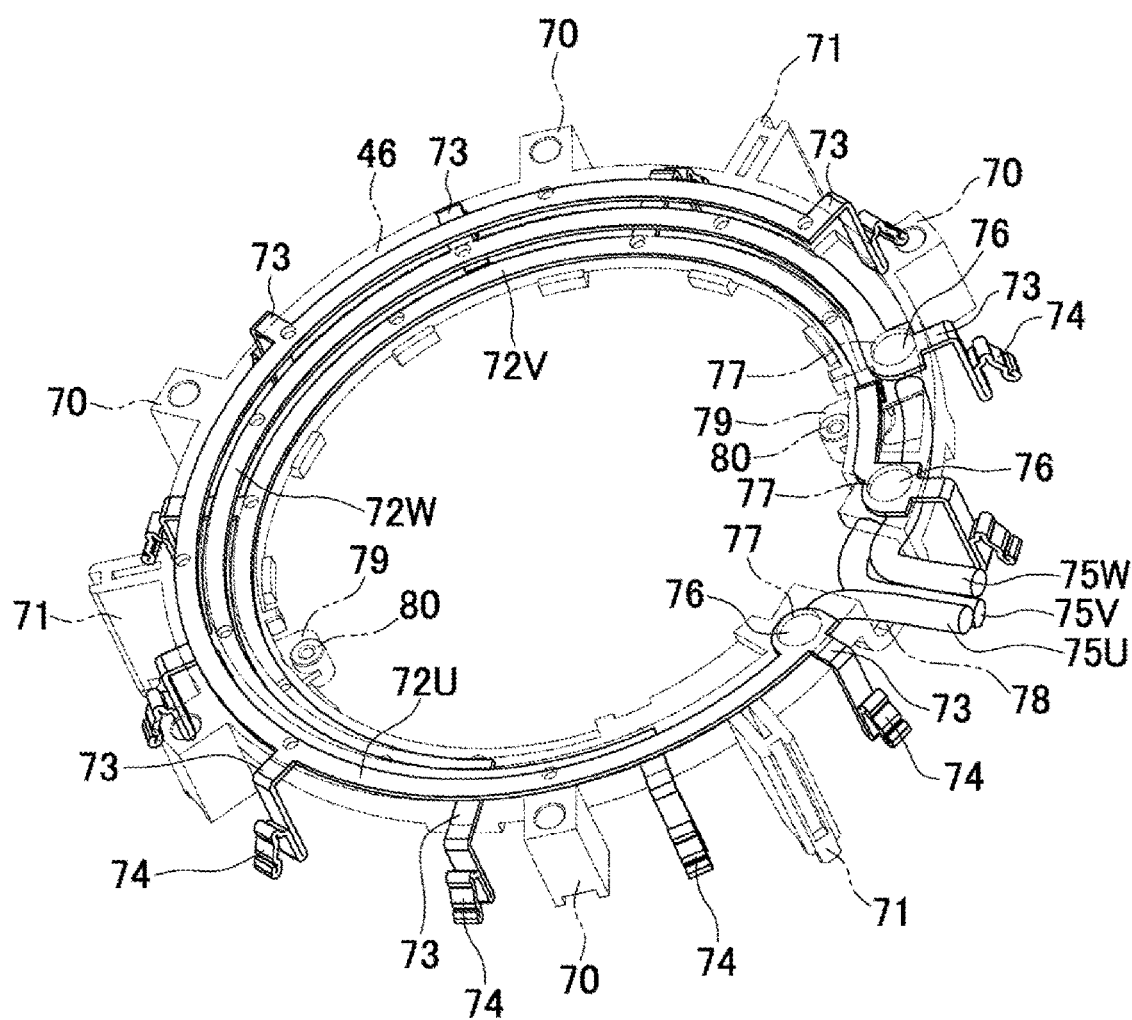
FIG. 14 is a perspective view of a short-circuiting member with first to third metal fittings indicated by solid lines.

The short-circuiting member 46 has a stepped shape with an axial thickness decreasing in a stepwise manner from the upper surface in the direction from the outer circumference to the inner circumference. As shown in FIG. 14, thick parts include a first metal fitting 72U having the largest diameter, a second metal fitting 72W having an intermediate diameter, and a third metal fitting 72V having the smallest diameter. The first metal fitting 72U, the second metal fitting 72W, and the third metal fitting 72V are formed by insert molding and are arranged concentrically. The first metal fitting 72U is at the outermost circumferential position or constitutes the thickest portion. The second metal fitting 72W is at an intermediate circumferential position inward from the first metal fitting 72U. The third metal fitting 72V is at the innermost circumferential position inward from the second metal fitting 72W. The letters U, W, and V given to the metal fittings represent the corresponding U-phase, W-phase, and V-phase of a three-phase current.

The first to third metal fittings 72U to 72V are C-shaped strip plates as viewed from above. The first to third metal fittings 72U to 72V each have four protruding pieces 73 protruding radially outward at positions including the two ends and two points that are point-symmetric to the two ends. Each protruding piece 73 has the fuse terminal 74 on its distal end. Each fuse terminal 74 is first bent downward from the protruding piece 73 and then folded upward and further bent outward. The first metal fitting 72U has a weld (first weld) 76 for spot-welding a power supply line 75U at the root of the protruding piece 73 located at one end. The second metal fitting 72W has a weld (second weld) 76 for spot-welding a power supply line 75W at the root of the protruding piece 73 at its end opposite to the end of the first metal fitting 72U with the weld 76. The third metal fitting 72V also has a weld (third weld) 76 for spot-welding a power supply line 75V at the root of the protruding piece 73 at its end opposite to the end of the first metal fitting 72U with the weld 76.

The first, second, and third metal fittings 72U, 72W, and 72V are arranged in the short-circuiting member 46 in the stated order from above with the phases each shifted circumferentially by a predetermined angle. The short-circuiting member 46, having the first to third metal fittings 72U to 72V formed by insert molding, has fuse terminals 74 protruding at circumferentially and substantially equal intervals from the outer circumference surface with no contact with other terminals. The short-circuiting member 46 has through-holes 77 through which the welds 76 on the metal fittings 72U to 72V are to be exposed. The power supply lines 75U to 75V are spot-welded to the corresponding welds 76. A cutout 78 is formed between the first weld 76 and the third weld 76. The cutout 78 is closed only with the lower side of the short-circuiting member 46. The cutout 78 allows the power supply lines 75U to 75V to be directed outward.

The short-circuiting member 46 has, at two points that are symmetric to each other on the inner circumference, two support pieces 79 protruding toward the center. The support pieces 79 have mounting bosses 80 for mounting the sensor circuit board 47. The short-circuiting member 46 has, between the two support pieces 79 on the inner circumference, receiving pieces 81 (FIG. 9) protruding toward the center for supporting the outer circumference of the sensor circuit board 47.

The sensor circuit board 47 is an arc-shaped strip plate and is located inward from the short-circuiting member 46. The sensor circuit board 47 has, on its two circumferential ends, fitting holes 85 into which the mounting bosses 80 included in the support pieces 79 are fitted. The mounting bosses 80 are fitted into the fitting holes 85, and the receiving pieces 81 support the outer circumference. As shown in FIGS. 8 and 9, this structure allows the short-circuiting member 46 to hold the sensor circuit board 47 on its inner circumference. The sensor circuit board 47 has, on its back surface, rotation detecting elements 86 (FIG. 10). The rotation detecting elements 86 are, for example, Hall devices, and detect the magnetic field of the permanent magnet plates 64 in the rotor 24. A signal line 87 connected to the sensor circuit board 47 and the power supply lines 75U to 75V are directed outside through the cutout 78 in the short-circuiting member 46. The position at which these lines are directed outside corresponds to the slit 107 (FIGS. 3 and 4) on the upper case 26.

As described above, the five fitting bosses 70 on the outer circumference receive the fastening bosses 54 on the upper surface of the upper insulator 42, and are fastened to the fastening bosses 54 with screws 88 (FIG. 9) placed from above. Also, the leading edges of the three engagement ribs 71 are engaged with the grooves 40a on the stator core 40, and the fuse terminals 74 are held by the terminal holders 50 on the upper insulator 42. In this manner, the short-circuiting member 46 is mounted onto the stator 23 with the sensor circuit board 47. In particular, the engagement ribs 71 are engaged with the grooves 40a at three positions and thus anchored to stably support the short-circuiting member 46. The power supply lines 75U to 75V and the signal line 87 are directed outside through the slit 107 on the upper case 26 with a sleeve-shaped packing 89 (FIG. 3) fitted into the slit 107.

Method for Forming Coils

Figure 15:
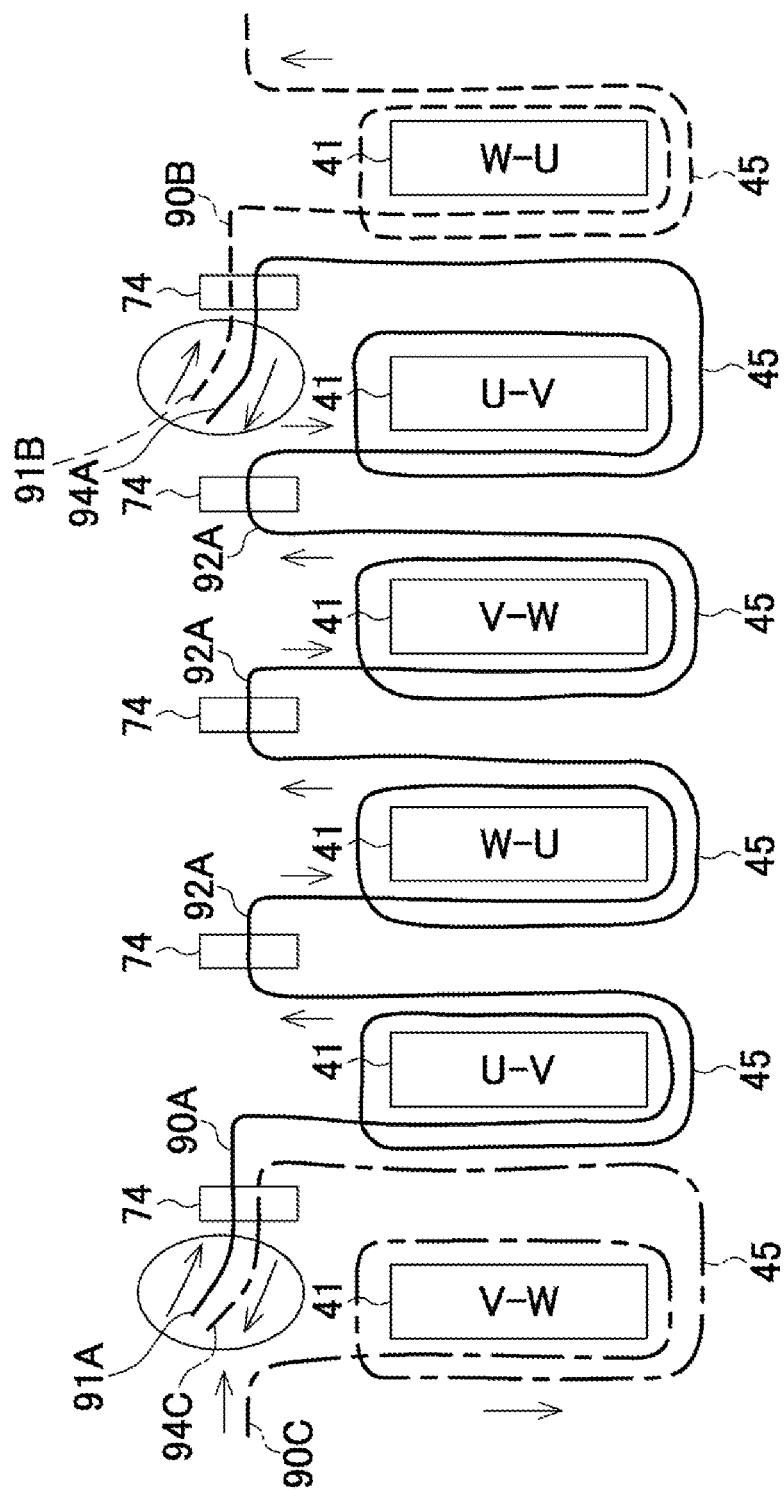
FIG. 15 is a diagram describing a method for winding coils.
Figure 16A:
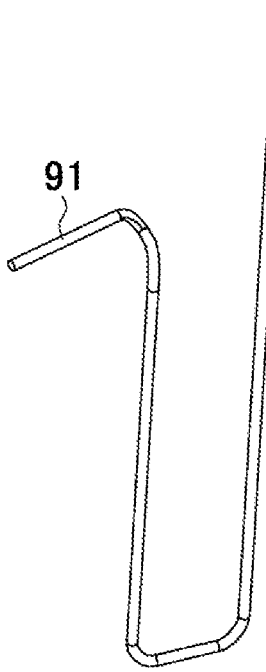
FIGS. 16A to 16C are diagrams describing the winding direction of a wire.
Figure 16B:
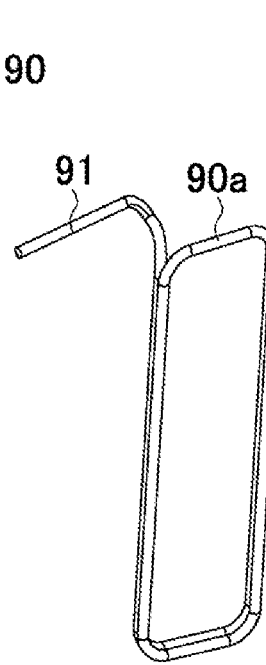
Figure 16C:
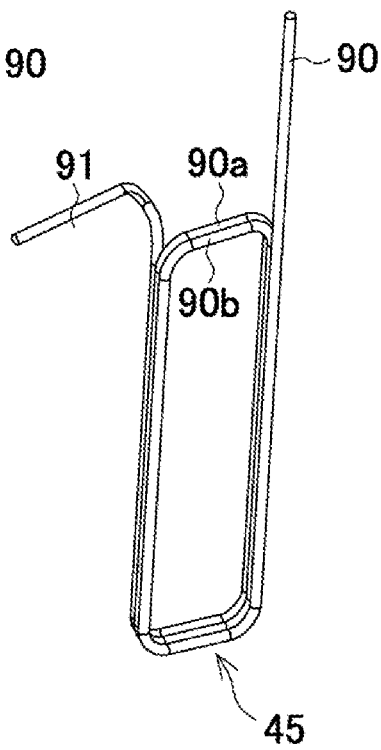

As shown in FIG. 15, the coils 45 are formed by winding a single wire 90 (three wires may be identified by the reference numerals followed by letters A to C, such as 90A, 90B, and 90C; the same applies hereafter) around each of the three teeth 41 located at intervals of 120 degrees using three winding nozzles. The wire 90 is then wound sequentially around four teeth 41 adjacent in the circumferential direction of the stator 23. This forms the twelve coils 45 at the same time. For example, the wire 90A shown in FIG. 15 has its starting end 91A first fixed on the first corresponding fuse terminal 74 and is wound sequentially around one tooth 41 after another tooth 41 that is adjacent clockwise (to the right in FIG. 15) to form the coils 45. As shown in FIGS. 16A to 16C, the winding direction is counterclockwise from the teeth 41 in this case. A connecting wire 92A, which is a wire portion following the formed coil 45, is directed toward the upper insulator 42 (connecting side) and fixed on the fuse terminal 74 between the teeth 41.

Figure 17A:
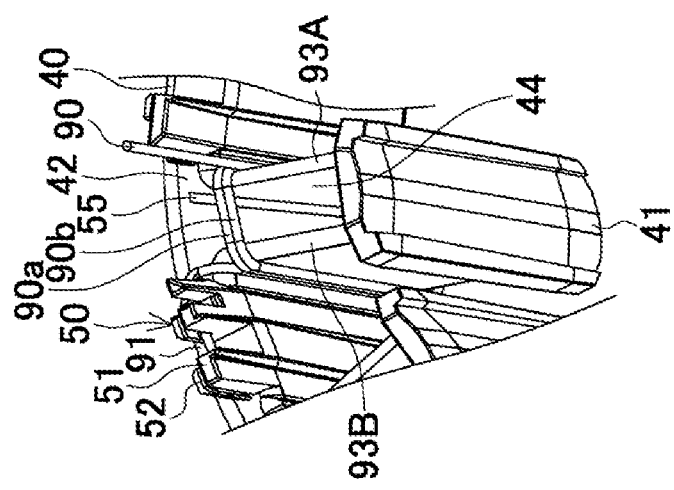
FIGS. 17A to 17C are diagrams describing a procedure for winding a wire around a tooth.
Figure 17B:
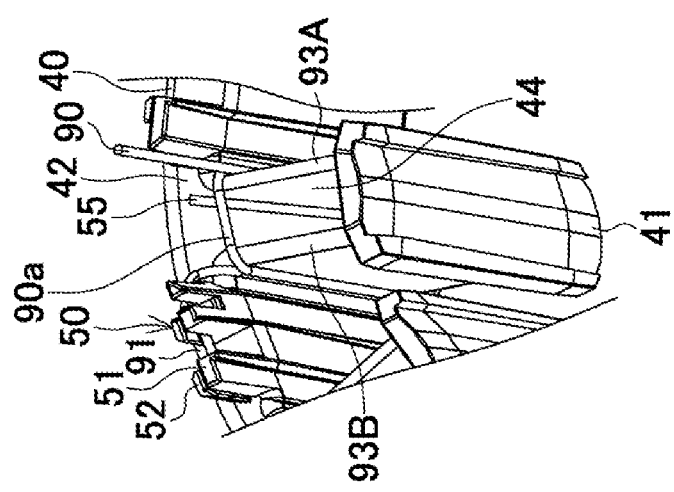
Figure 17C:
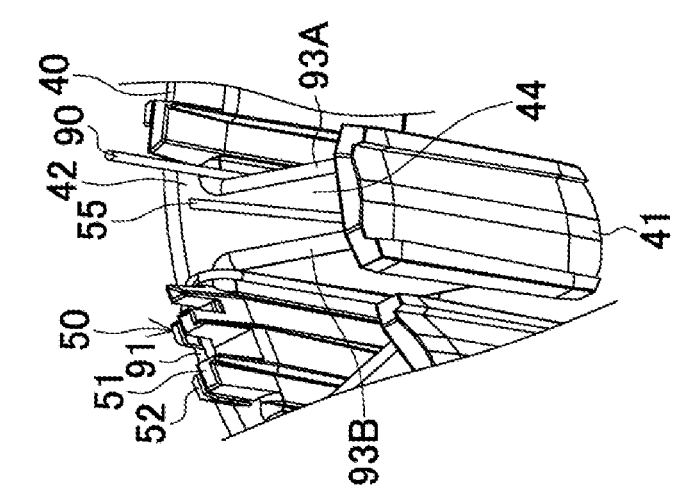

At the insulating unit 44 of the upper insulator 42, as shown in FIG. 17A, the wire 90 directed toward the connecting side comes in contact with a nearby edge 93A of the insulating unit 44 located on the upper end face of the tooth 41, and is sequentially wound around the edge 93A perpendicularly. The wire 90 then comes in contact with the oblique rib 55, and is wound over the oblique rib 55 perpendicularly. The wire 90 is thus wound around the insulating unit 44 while sliding toward the root of the tooth 41. A wire 90a of the first turn shown in FIG. 17B is wound around the root of the tooth 41 at an edge 93B of the insulating unit 44 opposite to the edge 93A. Likewise, a wire 90b of the second turn comes in contact with the nearby edge 93A and then with the oblique rib 55. As shown in FIG. 17C, the wire 90b of the second turn is wound in an aligned manner, following the wire 90a of the first turn. The same applies to a wire of the third turn and subsequent wires. At the lower insulator 43, the wire 90 moves over the rib 57 after coming in contact with the nearby edge 93A, and then comes in contact with the opposite edge 93B and is wound in an aligned manner as well.

When the wire 90 is wound around the insulating unit 44 with a predetermined number of turns, each turn of the wire 90 is supported by three points including the left and right edges 93A and 93B and the oblique rib 55 on the upper surface of the insulating unit 44 as shown in FIG. 12. Each turn of the wire 90 is also supported by three points including the left and right edges 93A and 93B and the rib 57 on the lower surface of the insulating unit 44. As shown in FIGS. 6 and 10, each coil 45 is formed with the upper and lower insulators 42 and 43 and the oblique rib 55 and the rib 57 in between.

As shown in FIG. 10, after the fourth coil 45 is formed, the wire 90A is first fed toward the lower insulator 43 (opposite to the connecting side), and is then wound around the guide wall 56 at the root of the wound tooth 41 from outward. The wire 90A is then directed toward the upper insulator 42 again, and is fixed on the fuse terminal 74 on which a starting end 91B of an adjacent wire 90B is fixed. The wire 90A ends at this position to have a terminal end 94A. As shown in FIG. 15, the starting end 91B of the other wire 90B and the terminal end 94A thus extend in the same direction. These wires can be cut at the same time within the area enclosed by a circle in the figure. The same applies to the terminal end 94B of the wire 90B and the starting end 91C of the wire 90C, and the terminal end 94C of the wire 90C and the starting end 91A of the wire 90A.

Figure 18:
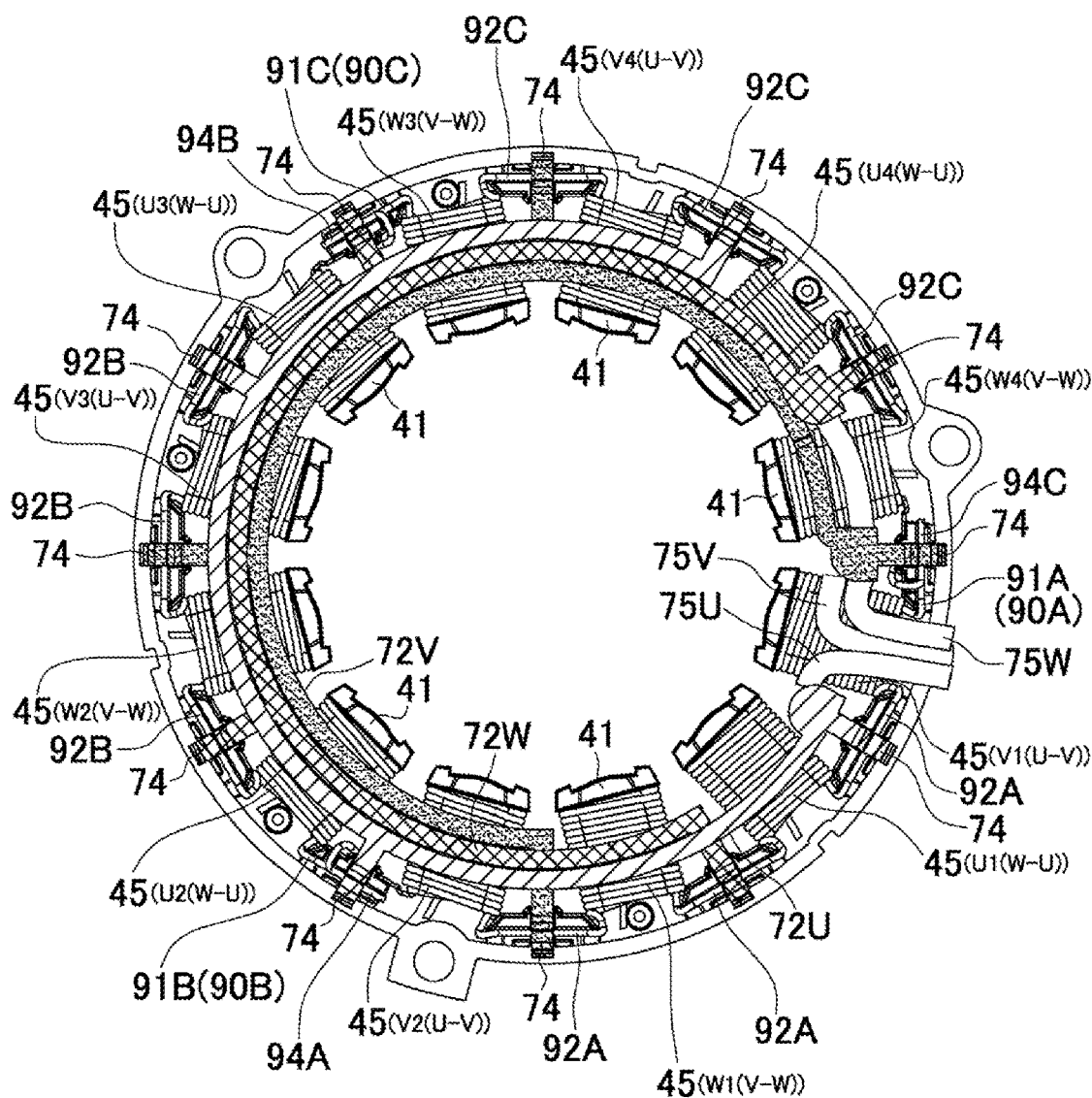
FIG. 18 is a diagram describing a connection using the first to third metal fittings as viewed from above the stator.

The first to third metal fittings 72U to 72V are arranged in the short-circuiting member 46 with their phases circumferentially shifted by one coil 45. As shown in FIG. 18, the first to third metal fittings 72U to 72V fuse the connecting wires 92 between the twelve coils 45, with the three coils 45 placed between the connecting wires 92. In FIG. 18, the first metal fitting 72U is hatched, the second metal fitting 72W is cross-hatched, and the third metal fitting 72V is dotted for easily distinguishing the connecting wires 92 that are fused by the first to third metal fittings 72U to 72V.

Figure 19:
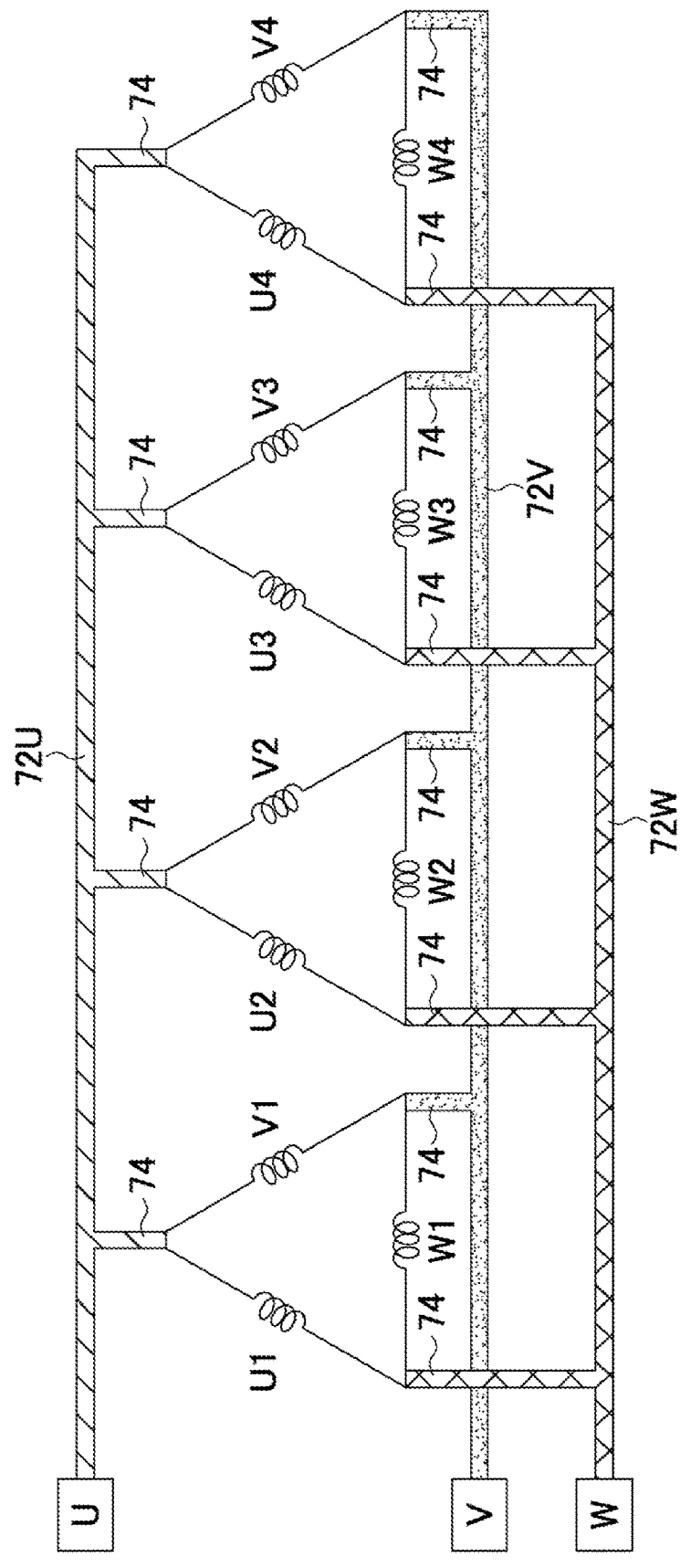
FIG. 19 is a circuit diagram of the connection using the first to third metal fittings.

The three coils 45 adjacent in the circumferential direction are delta connected by the first to third metal fittings 72U to 72V in each phase as U(W-U), V(U-V), and W(V-W). The four sets of three coils 45 are sequentially arranged adjacent to one another with the first to third metal fittings 72U to 72V. The resultant three-phase circuit has the structure shown in FIG. 19. The three-phase circuit equates to the delta connection in which four coils of each phase, or specifically coils U1 to U4, V1 to V4, and W1 to W4 are delta connected in parallel to one another.

Motor Case

The upper case 26 and the lower case 27 in the motor case 22 are shaped in circular cups and are attached to cover an upper portion and a lower portion of the stator 23.

The upper case 26 is formed from a non-magnetic material, such as an aluminum alloy. As shown in FIGS. 3 to 5, the upper case 26 has fins 100 for dissipating heat. The fins 100 extend vertically and stand erect at circumferentially predetermined intervals from an outer peripheral area of the upper surface of the upper case 26 along the side surface. The upper case 26 has, at the center of its upper surface, an upper bearing holder 101. The upper bearing holder 101 holds a bearing 103 to support an upper end of the rotational shaft 25 with a resin insulator cap 102. The upper bearing holder 101 has a central through-hole 104 that is closed with a resin cap 105.

The upper case 26 has three screw bosses 106A and 106B (two screw bosses 106A and one screw boss 106B) extending vertically at circumferentially equal intervals on the outer circumferential surface. The screw bosses 106A and 106B each protrude radially outward. The screw bosses 106A and 106B respectively correspond to the ridges 48A and 48B on the stator core 40. The screw bosses 106A and 106B have openings each with a tapered or rectangular cross section in their lower ends, into which the ridges 48A and 48B are to be fitted. The upper case 26 has, on its outer circumferential surface, a slit 107 that extends upward from the lower end between the ridges 48A and 48B.

The lower case 27 includes a circular end portion 108 and a cylindrical portion 110. The end portion 108 has a lower bearing holder 109 at the center in the same manner as the upper case 26. The cylindrical portion 110 stands upward on the outer periphery of the end portion 108. The lower bearing holder 109 holds a bearing 111 to support the rotational shaft 25 that extends through the lower bearing holder 109. The cylindrical portion 110 has four bosses 112 for fastening the lower case 27 to the base plate 28 by screwing. The bosses 112 face downward at circumferentially equal intervals on the outer circumference.

A resin layer 113 continuously covers the inner surface of the end portion 108 excluding the lower bearing holder 109 and the inner and outer circumferences of the cylindrical portion 110 excluding the bosses 112. The resin layer 113 has, at positions corresponding to the ridges 48A and 48B on the stator core 40, boss parts 114A and 114B that extend axially. The boss parts 114A and 114B have the same shapes as the corresponding screw bosses 106A and 106B on the upper case 26. The boss parts 114A and 114B have throughholes each with a tapered or rectangular cross section in their upper ends, into which the ridges 48A and 48B are to be fitted. The boss parts 114A and 114B have rectangular grooves 115 extending continuously from their lower ends.

The upper case 26 is then placed to cover the upper portion of the stator 23 with the screw bosses 106A and 106B aligned with the ridges 48A and 48B on the stator core 40, and the bearing 103 mounted on the upper end of the rotational shaft 25 of the rotor 24 held by the upper bearing holder 101. The lower case 27 is placed to cover the lower portion of the stator 23 with the boss parts 114A and 114B aligned with the ridges 48A and 48B on the stator core 40, and with the lower bearing holder 109 holding the bearing 111 mounted on the lower end of the rotational shaft 25. In this state, the boss parts 114A and 114B on the lower case 27 receive screws 116 that are inserted from below through the ridges 48A and 48B and then screwed into the screw bosses 106A and 106B on the upper case 26. The brushless motor 21 is thus covered by the upper case 26 and the lower case 27, except the outer circumference of the stator core 40 partially uncovered. This completes the motor unit 16.

In this state, firstly, basic insulation is performed to the brushless motor 21 with basic insulators (the upper and lower insulators 42 and 43 and the insulating unit 44 formed integrally) placed between the stator core 40, which is an inner metal, and the coil 45, which is a charger.

Further, supplementary insulation is performed to the brushless motor 21 with the resin 61 placed between the rotational shaft 25 and the rotor core 60, with the insulator cap 102 placed between the upper case 26 and the rotational shaft 25, and with the resin layer 113 placed between the cylindrical portion 110 of the lower case 27 and the stator core 40. The stator core 40 and the rotational shaft 25 are thus double-insulated from each other. The vertical clearance between the upper case 26 and the lower case 27 can be used in mounting the stator 23 with any other axial dimension.

The motor unit 16 is placed on the base plate 28 with the rotational shaft 25 facing downward, and is fastened to the base plate 28 with screws placed in the bosses 112 from below the base plate 28. The end portion 108 of the lower case 27 has arc ribs 108a (FIGS. 2 and 5) arranged concentrically on its lower surface. The arc ribs 108a are fitted with the cylindrical unit 11 to position the motor unit 16.

The motor cover 29 is placed to cover the motor unit 16 with the central portion including the upper bearing holder 101 in the upper case 26 being exposed, and with the fins 100 on the upper case 26 arranged adjacent to the inner surface of the motor cover 29.

The stator 23 in the brushless motor 21 is locked not to rotate with respect to the motor case 22 with the screws 116 extending through the ridges 48A and 48B, the screw bosses 106A and 106B on the upper case 26 into which the ridges 48A and 48B are fitted, and the boss parts 114A and 114B on the lower case 27.

Operation of Lawn Mower

In the lawn mower 1 according to the present embodiment, the lock-off button 9 is pressed to unlock the switch lever 8, and the switch lever 8 is pulled to turn on the main switch and transmit an ON signal from the battery pack 13 to the control circuit board included in the controller 15. A microcomputer included in the control circuit board obtains the rotational state of the rotor 24 based on a detection signal transmitted from the rotation detecting element 86 in the sensor circuit board 47. The microcomputer turns on or off a switching element mounted on the control circuit board in accordance with the obtained rotational state, and applies a current through the coils 45 of each phase included in the stator 23 sequentially to rotate the rotor 24. The rotational shaft 25 then rotates to rotate the cutting blade 20 together with the spindle 17. The handle 4 is then operated to push the base 2, thus allowing the lawn mower 1 to cut grass with the cutting blade 20 while running.

In this state, the stator 23 in the brushless motor 21 is locked with the screws 116 extending through the ridges 48A and 48B, and is not rotatable with respect to the motor case 22 mounted on the base plate 28. In this manner, the stator 23 is locked not to rotate in a manner highly accurate and less susceptible to tolerances, and further in a reliable manner. The screws 116 extend directly through the stator core 40. This structure is less likely to deform than the structure for connecting the upper and lower cases 26 and 27 with screws 116 outside the stator core 40.

This also prevents the wires 90 for the coils 45 from crossing and reduces wear due to contact with each other, and thus improves durability. In particular, each wire 90 is supported by three points including the oblique rib 55 or the rib 57 on the upper or lower surfaces of the insulating unit 44 and the edges 93A and 93B, and is thus less likely to be loose or mispositioned.

The lawn mower 1 according to the present embodiment includes the brushless motor 21 (motor) including the stator 23 and the rotor 24. The stator 23 includes the stator core 40 including the protruding teeth 41, the upper and lower insulators 42 and 43 covering the upper and lower end faces of the teeth 41 in the axial direction of the stator core 40, the oblique ribs (ribs) 55 located in middle portions of the upper end faces of the teeth 41 covered with the upper insulator 42, each protruding from the upper end face, and oblique to the protruding direction of the teeth 41, the ribs 57 located in middle portions of the lower end faces of the teeth 41 covered with the lower insulator 43 and each protruding from the lower end face, and the coils 45 formed by winding the wires 90 around the teeth 41 with the upper and lower insulators 42 and 43 and the oblique ribs 55 and the ribs 57 in between. The wires 90 are thus wound around the teeth 41 of the stator 23 in an aligned manner. This prevents the wires 90 from crossing and from having a smaller number of turns, and thus forms the coils 45 with an appropriate total number of turns.

In particular, the oblique rib 55 on the upper insulator 42 and the rib 57 on the lower insulator 43 position each wire 90 in a more reliable manner.

Although the upper rib is oblique and the lower rib extends along the protruding tooth in the above embodiment, the lower rib may be oblique and the upper rib may extend along the protruding tooth. Both the ribs on the upper and lower end faces may be oblique, or may extend along the protruding teeth.

Further, the ribs may not be on the end faces of both the upper and lower insulators. Either the upper or lower insulator may have the oblique rib or the rib extending along the protruding tooth on its end face. The height and the width of the ribs may be changed as appropriate. The ribs may have varying heights and widths in the radial direction of the stator. A plurality of ribs may be formed on the end face of either the upper or lower insulator.

The ribs may not be formed integrally with the insulators, but may be rib-shaped separate components that are fixed to the end faces of the insulators. Such components serve as guides for the wire to the basal ends of the teeth during wire winding. This also allows the wire to be wound in an aligned manner as in the above embodiment. The shape of the components may be modified in the same manner as the ribs.

A method for forming the coils 45 on the stator 23 according to the present embodiment includes placing, on the stator core 40 including the teeth 41 protruding from the rotor core, the upper and lower insulators 42 and 43 covering the upper and lower end faces of the teeth 41 in the axial direction of the stator core 40, placing, in middle portions of the upper and lower end faces covered with the upper and lower insulators 42 and 43, the oblique ribs 55 and the ribs 57 protruding from the upper and lower end faces, and winding the wires 90 around the teeth 41 with the upper and lower insulators 42 and 43 and the oblique ribs 55 and the ribs 57 in between. Thus, the wires 90 can be wound around the teeth 41 of the stator 23 in an aligned manner. This prevents the wires 90 from crossing and from having a smaller number of turns, thus forming the coils 45 with an appropriate number of turns.

The order in which the wires are wound around the teeth is not limited to the order described in the above embodiment, and may be changed as appropriate. For example, a single wire may be wound continuously around adjacent teeth in the circumferential direction sequentially to form coils, or in other words, the coils may be formed by continuous winding. The short-circuiting member may form a star connection in place of a delta connection by changing the positions or the dimensions of the metal fittings. To form the three-phase connection, the insulators may hold the fuse terminals independently of the metal fittings or the wire may be soldered to the fuse terminals directly without the short-circuiting member.

The electric work machines in the above embodiments of the present invention include, other than lawn mowers, for example, compressors, gardening tools such as chain saws, hedge trimmers, grass mowers, and blowers, and power tools such as angle drills, grinders, hammers, hammer drills, circular saws, and reciprocating saws.

REFERENCE SIGNS LIST

1 lawn mower
2 base
3 body
4 handle
10 body housing
15 controller
16 motor unit
17 spindle
20 cutting blade
21 brushless motor
22 motor case
23 stator
24 rotor
25 rotational shaft
26 upper case
27 lower case
40 stator core
41 tooth
42 upper insulator
43 lower insulator
45 coil
46 short-circuiting member
47 sensor circuit board
50 terminal holder
55 oblique rib
57 rib
60 rotor core
72U, 72W, 72V first to third metal fittings
74 fuse terminal
90 wire
91 starting end
93A, 93B edge
94 terminal end

What is claimed is:

1. An electric work machine, comprising:
    a motor including
        a rotor, and
        a stator including
            a stator core having a first end face and a second end face, and having teeth protruding inwardly,
            a first insulator covering the first end face,
            a second insulator covering the second end face,
            a rib located on at least one of the first insulator or the second insulator, and overlapping the teeth in an axial direction of the teeth, and
            coils including a wire wound around the teeth via the first insulator and the second insulator and the rib.

2. The electric work machine according to claim 1, wherein
    the stator includes a plurality of the ribs, and
    the ribs are located on the first insulator and the second insulator.

3. The electric work machine according to claim 2, wherein
    the rib extends from a root to a distal end of the corresponding tooth to diagonally pass a center of the tooth.

4. The electric work machine according to claim 2, wherein
    the rib extends straight through a center of the corresponding tooth.

5. The electric work machine according to claim 2, wherein
    the stator includes guide parts located on the first insulator or the second insulator to guide the wire to a basal end of each tooth when the wire is wound.

6. The electric work machine according to claim 2, wherein
    the rib extends more radially outward than the wire.

7. The electric work machine according to claim 1, wherein
    the rib extends from a root to a distal end of the corresponding tooth to diagonally pass a center of the tooth.

8. The electric work machine according to claim 7, wherein
    the stator includes guide parts located on the first insulator or the second insulator to guide the wire to a basal end of each tooth when the wire is wound.

9. The electric work machine according to claim 7, wherein
    the rib extends more radially outward than the wire.

10. The electric work machine according to claim 1, wherein
    the rib extends straight through a center of the corresponding tooth.

11. The electric work machine according to claim 10, wherein the stator includes guide parts located on the first insulator or the second insulator to guide the wire to a basal end of each tooth when the wire is wound.

12. The electric work machine according to claim 10, wherein
the rib extends more radially outward than the wire.

13. The electric work machine according to claim 1, wherein
the first insulator has the rib that extends from a root to a distal end of the corresponding tooth to diagonally pass a center of the tooth, and
the second insulator has the rib that extends straight through a center of the corresponding tooth.

14. The electric work machine according to claim 13, wherein
the stator includes guide parts located on the first insulator or the second insulator to guide the wire to a basal end of each tooth when the wire is wound.

15. The electric work machine according to claim 13, wherein
the rib extends more radially outward than the wire.

16. The electric work machine according to claim 1, wherein
the stator includes guide parts located on the first insulator or the second insulator to guide the wire to a basal end of each tooth when the wire is wound.

17. The electric work machine according to claim 16, wherein
the rib is located radially inward from the guide parts.

18. The electric work machine according to claim 1, wherein
the rib extends more radially outward than the wire.

19. The electric work machine according to claim 1, wherein
the wire is wound from radially outside to inside.

\* \* \* \* \*